United States Patent [19]

Anders

[11] Patent Number: 4,642,039
[45] Date of Patent: Feb. 10, 1987

[54] APPARATUS FOR PRODUCING PROFILES OR WEBS SUCH AS TREAD STRIPS FOR VEHICLE TIRES

[75] Inventor: Dietmar Anders, Sandton, South Africa

[73] Assignee: Hermann Berstorff Maschinenbau GmbH, Hanover, Fed. Rep. of Germany

[21] Appl. No.: 743,906

[22] Filed: Jun. 12, 1985

[30] Foreign Application Priority Data

Jun. 30, 1984 [DE] Fed. Rep. of Germany ....... 3424257

[51] Int. Cl.$^4$ ............................................. B29C 47/92
[52] U.S. Cl. ..................................... 425/140; 264/39; 264/40.2; 264/177 R; 425/149; 425/188; 425/192 R; 425/376 B
[58] Field of Search ............... 425/376 A, 376 B, 374, 425/381, 192 R, 589, 592–595, 133.1, 188, 131.1, 140, 141, 149, 150, 327; 264/39, 177 R, 40.2

[56] References Cited

U.S. PATENT DOCUMENTS

| | | | |
|---|---|---|---|
| 3,433,292 | 3/1969 | McDonald | 425/593 X |
| 3,482,279 | 12/1969 | Anders et al. | 425/327 X |
| 3,505,708 | 4/1970 | Moslo | 425/589 X |
| 3,649,147 | 3/1972 | Fritsch | 425/376 B X |
| 3,947,201 | 3/1976 | Ellwood | 425/381 X |
| 4,060,368 | 11/1977 | Theysohn | 425/376 B |
| 4,171,193 | 10/1979 | Rahlfs | 425/376 A X |
| 4,245,971 | 1/1981 | MacMillan | 425/589 X |
| 4,354,814 | 10/1982 | Grimminger et al. | 425/192 R X |
| 4,464,104 | 8/1984 | Gneuss | 425/192 R |
| 4,465,451 | 8/1984 | Adderley, Jr. | 425/376 A X |
| 4,526,528 | 7/1985 | Kline et al. | 425/376 B X |
| 4,539,169 | 9/1985 | Nixon et al. | 425/131.1 X |
| 4,544,340 | 10/1985 | Hehl | 425/589 X |
| 4,548,568 | 10/1985 | Herbert et al. | 425/131.1 |
| 4,564,347 | 1/1986 | Vaughan | 425/376 B X |

FOREIGN PATENT DOCUMENTS 5077 10/1979 European Pat. Off. .
2457532 11/1979 Fed. Rep. of Germany .

*Primary Examiner*—Richard L. Chiesa
*Attorney, Agent, or Firm*—Schwartz, Jeffery, Schwaab, Mack, Blumenthal & Evans

[57] ABSTRACT

An apparatus for producing profiles or webs such as tread strips for vehicle tires from suitable materials, comprises, in sequence, a screw extruder, an extrusion head and a rotatable roller. The roller is disposed in such a manner that the screw can be removed over the roller without interfering with the roller. To achieve this, the head comprises an upper and a lower portion, the upper portion being pivotable so that it can be moved out of the path of the screw when this latter is removed. The pivot points for the upper portion of the head are on lateral walls. The upper portion of the head is also lockable in its working position, the head portion facing the roller being spaced from the surface of the roller.

3 Claims, 2 Drawing Figures

APPARATUS FOR PRODUCING PROFILES OR WEBS SUCH AS TREAD STRIPS FOR VEHICLE TIRES

FIELD OF THE INVENTION

The invention relates to an apparatus for producing profiles or webs such as tread strips for vehicle tires.

BACKGROUND OF THE INVENTION AND PRIOR ART DISCUSSION

In Euorpean Patent Specification No. 00 05 077, there is disclosed a so-called single-roller head which is used for the production of rubber or the like profiles. In such an arrangement, there is provided an extrusion unit, an extrusion head and a rotatable roller. In use, the extrusion unit, including the head, is moved under tension towards the roller. The head is in portions and a bearing plate is inserted between such portions and the roller. The bearing plate is made from a self-lubricating material such as molybdenum sulphide or polytetrafluoroethylene.

Such bearing plates have not, however, proved satisfactory in use. This is because the plate and the roller are not wear-resistant. The major disadvantage of such an arrangement is, however, that material can become lodged between the bearing plate and the surface of the roller. Such material is easily vulcanised and even burnt in this region due to the friction forces and the initial-tensioning pressure by means of which the bearing plate is pressed against the head. The burned residues cause the extruded profile or web to contain a high percentage of impurities and therefore to be useless.

An additional disadvantage of such single-roller head is that the entire head has to be removed if the mixture being extruded is changed and it is necessary to clear the head. Although the roller can be moved horizontally away from the head by means of spindles it is not possible to extract the screw from the extruder without first removing the head.

OBJECTS OF THE INVENTION

The present invention seeks to provide an apparatus of the single-roller head shown in the European patent specification but in which the above-mentioned disadvantages are obviated or at least minimized. In particular, the present invention seeks to provide an apparatus in which the head is made considerably more compact, is easier to operate (even if the mixture being extruded is changed) and which can be cleaned more rapidly and easily.

SUMMARY OF THE INVENTION

According to the present invention, there is provided an apparatus for producing profiles or webs such as tread strips for vehicle tires from rubber, elastomeric materials or thermoplastic materials, comprising a screw extruder, an extrusion head for profiling the material, within which is disposed an interchangeable profiled bar located downstream of the extruder and a rotating roller which is disposed substantially transversely to the extrusion head and downstream thereof, wherein the extruder barrel extends horizontally and the roller is rotatable about a horizontal axis, and the roller and the barrel being disposed such that the uppermost surface of the roller is at a level which is below that of the lowermost portion of the internal surface of the barrel, the head comprising an upper portion and a lower portion, the upper portion being pivotally mounted and being displaceable in directions towards and away from the lower portion; hydraulic or pneumatic cylinders being provided for effecting the pivotal movement of the upper portion of the head, attachment points for the cylinders being disposed on the upper portion of the head and on lateral housing members for the head, a locking device for locking the upper portion of the head in its working position, the locking means comprising hydraulically or pneumatically operable locking mechanism including wedge-shaped locking members which are mounted on the upper portion of the head and which engage in correspondingly shaped apertures formed in the lateral housing members for the head, the roller being mounted in bearings, which bearings are mounted on the housing walls in the region of the lower portion of the head, the portions of the head which face the roller being spaced from the surface thereof.

By disposing the roller horizontally so that it extends transversely to and downstream of the head and by ensuring that the topmost surface thereof is at a level which is below the lowest portion of the internal surface of the horizontally diposed bore in the extruder barrel, it is possible to extract the screw from the extruder barrel with no difficulty. It is, of course, necessary to pivot the upper portion of the head upwardly to permit this to be achieved. Thorough cleaning of the screw can be effected and/or the changing of the screw can then be effected. It is not necessary for the roller to be touched because the screw can be extracted over the top of the roller.

In order to make the single-roller head more compact, the pivotal mountings for the upper portion of the head and also the mounting for hydraulic cylinders for effecting such pivotal movement are disposed in the region of the upper portion of the head on the lateral housing members. Such mountings are not on a flange of the extruder barrel, as is the case in arrangements described in the prior art. This means ensures that the head is of a very compact construction and permits it to be flange-mounted on any extruder without the need for any special adaptation of the extruder itself.

To ensure rapid operation of the head, it is necessary to overcome the particular problem of locking the upwardly pivotal upper portion of the head onto the lateral housing members. This is because of the very high pressures (of up to 250 bars) subsisting in the head, which produces a high risk of leakage. It is particularly difficult to provide a locking means of this type so that the single-roller head can still be of a compact construction. Such locking can only be achieved, at a high cost, by using known lateral clamps for the upper and lower portions of the head. Such an arrangement is described, for example, in German Auslegeschrift No. 2 457 532 and shown in FIGS. 7 and 8 thereof.

In the present invention, this problem is also solved in a simple and highly effective manner. A hydraulically or pneumatically operable wedge-shaped locking mechanism is mounted on the upper portion of the head and includes two wedge portions, which are preferably conical. In use, these wedge portions are forced laterally outwardly into corresponding conically-shaped or tapering apertures formed in the lateral housing members. This causes the upper portion of the head to abut against the lower portion of the head with a high force and produces an effective seal.

This method of locking the head portions in their working positions occupies very little space and means that the head is still of a very compact construction.

An additional way in which the head can be made compact is to mount the roller in the lateral housing members for the head. In particular, this arrangement provides an exact relationship between the profiled bar and the surface of the roller. Moreover, this relationship can be reproduced exactly at any time, for example, even if the nozzle bar is changed. It is merely necessary that the upper portion of the head is clamped against the lower portion of the head by means of the wedge-shaped locking mechanism.

Compared with the head disclosed in European Patent Specification No. 00 05 077, the single-roller head of the present invention is improved because the need for bearing plates, made of a self-lubricating material, between the head and the surface of the roller, has been avoided. Consequently, there is no wear damage on the plates nor is there wear on the rollers. Somewhat surprisingly, it has transpired that, if the head portions facing towards the roller and spaced from the surface of the roller, the final width of the profile or web emerging from the head can be kept within relatively narrow tolerance limits once other parameters for the apparatus have been set. These parameters are the extrusion pressure in the head and the rotational speed of the roller.

Even better results can be achieved if the extrusion pressure in the head is measured and a control device is provided for regulating the final width of the profile or web emerging therefrom. The control device adjusts the rotational speed of the roller and/or upon the rotational speed of the extruder screw.

Alternatively, the edges of the profile or web may also be scanned by a photoelectric diode, and the values measured may be transmitted to a control device which then regulates the rotational speed of the roller and/or the rotational speed of the screw accordingly.

The aforementioned bearing plates disclosed in the prior European Patent Specification are used to shape the sides of the profile or web and to determine its final width. Such bearing plate should also prevent the material being extruded from emerging laterally from the head. In other words, the web or profile should be of a constant width when it emerges from the head. In consequence, the material has to be extruded with a predetermined pressure acting against the lateral boundaries of the bearing plate. However, this measure cannot prevent small quantities of material from being pressed under the bearing plate and burning as a result of frictional forces. This is extremely disadvantageous.

However, these lateral, rotating bearing plates are not necessary in the present invention because the pressure in the head may be measured and the circumferential speed of the roller regulated in dependence thereon. If the pressure rises, the circumferential speed of the rollers is slightly increased, so that more material is discharged. This causes the pressure to drop slightly and the final width of the profile to be reduced.

If, therefore, by increasing the circumferential speed of the roller, more material emerges from the outlet aperture (such aperture being defined at its lower end by the roller and at its upper end by a profiled bar), the extruded web or profile also becomes narrower. conversely, if the rotational speed of the roller is reduced, the strip or profile becomes wider.

This measure, therefore, permits the final width of the profile or web to be adjusted automatically and accurately without the need for lateral sealing plates or the like to be used.

A further disadvantage which arises when lateral sealing plates are used between the roller and front portion of the head is that, whenever it is desired to change the width of the extrusion, a new set of plates has to be installed. This causes production to be interrupted.

The provision of a control device, in conjunction with the use of different profiled bars for different widths emerging from the head, makes it possible for any profile width or web width to be produced automatically simply by controlling the rotational speed of the roller and/or the rotational speed of the screw in dependence upon the pressure of the material in the head or in dependence upon the width of the extruded material as detected by the photoelectric diodes. No physical lateral boundary members are therefore necessary.

The successful nature of the apparatus of the present invention is dependent upon the combination of the features set forth hereinbefore. The overall effect produced is much greater than the sum of the expected improvements from each individual feature.

A very compact single-roller head is thus achieved which produces good results in respect of its operation in terms of leakages and the accuracy of the extruded profile or web. In addition, the handling of the head is considerably facilitated because the head can be raised very rapidly simply by the disengagement of the lateral wedge-shaped locking mechanism. This, obviously, facilitates the cleaning of the head and the changing of the screw to a considerable extent.

BRIEF DESCRIPTION OF THE DRAWINGS

A preferred embodiment of an apparatus for producing profiles or webs or strips in accordance with the present invention will be further described, by way of example, with reference to the accompanying drawings, in which.

DESCRIPTION OF PREFERRED EMBODIMENT

Figure 1:
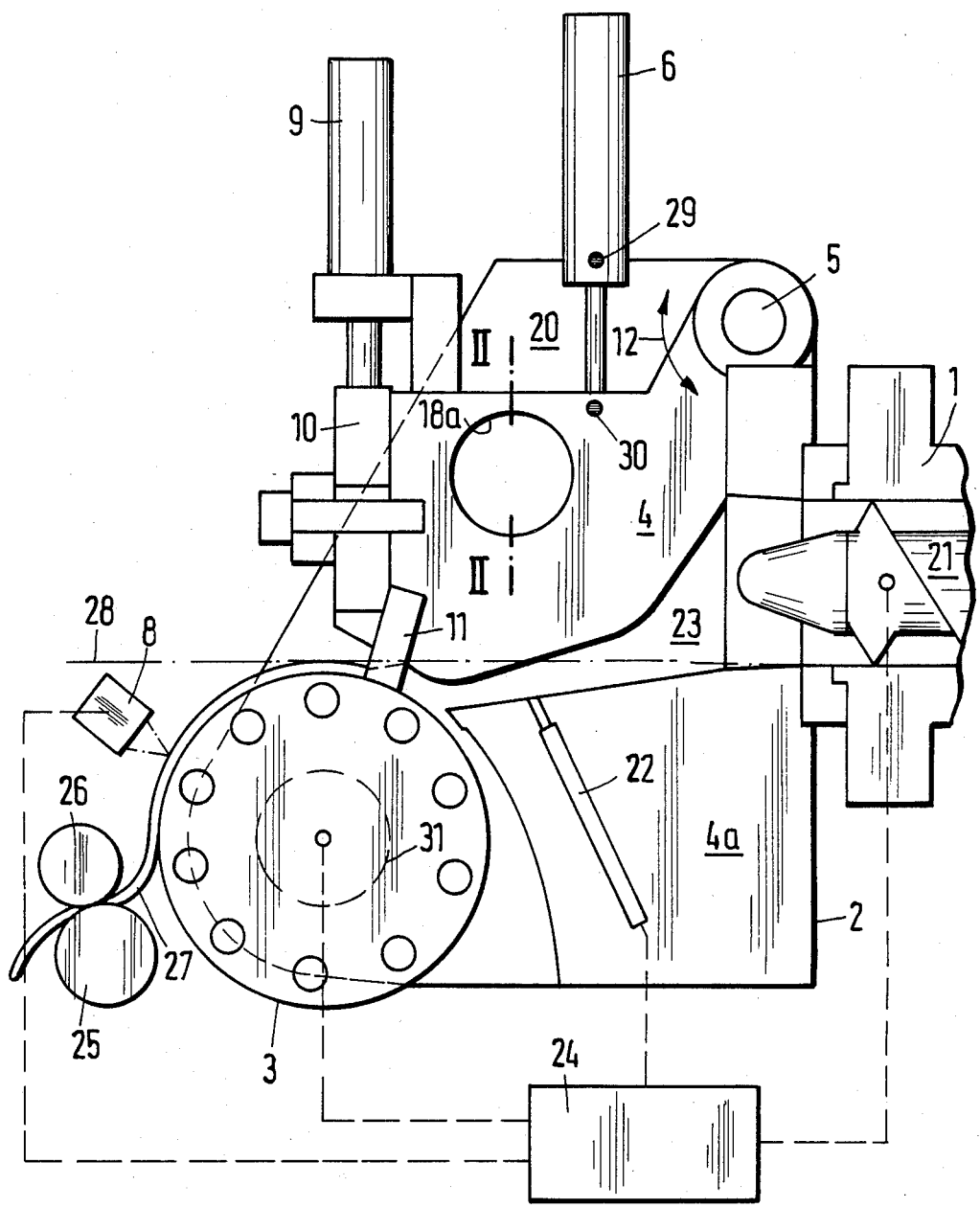
FIG. 1 is a longitudinal sectional view through the apparatus.

As can be seen most clearly in FIG. 1, an apparatus in accordance with the present invention comprises three basic sections. These are an extruder 1, a head 2 and a single roller 3.

The head 2 comprises a lower portion 4a and an upper portion 4 pivotally mounted about pivot points 5. The upper portion 4 can thus be pivoted relative to the lower portion 4a. To effect such pivotal movement, a hydraulic piston and cylinder arrangement 6 is provided. The direction of pivotal movement of the upper portion 4 of the head is denoted by the doubleheaded arrow 12. The piston and cylinder arrangement 6 has two mounting points 30 for the attachment thereof to the upper portion 4 of the head, and two mounting points 29 for the attachment of the arrangement 6 to lateral housing members 20 and 19 respectively.

In interchangeable profiled bar 11, which determines the shape of the web or profile produced, is retained securely in position by means of a hydraulic cylinder 9 and holders 10 which are connected to the cylinder 9. The use of such a profiled bar is well known in the art and it is believed that further discussion thereof is unnecessary.

Figure 2:
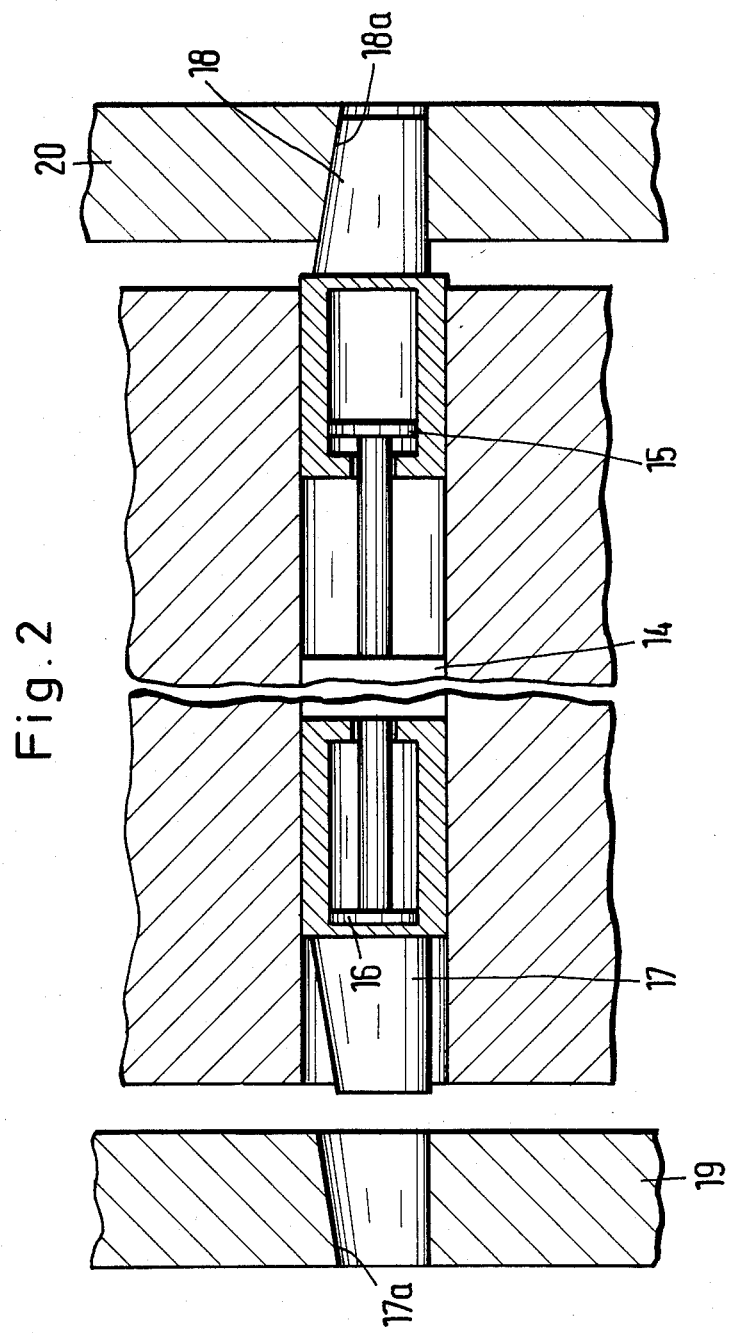
FIG. 2 is a sectional view taken along the line II—II of FIG. 1.

The upper portion of the head must, obviously, be lockable in a desired position. To achieve this, a wedge-shaped locking mechanism, shown in FIG. 2, is provided. The mechanism comprises a base plate 14 which is engaged at its two ends by hydraulic piston and cylinder arrangements 15 and 16.

Wedge portions 17 and 18 are mounted on the ends of the hydraulic piston and cylinder arrangements 16 and 15 respectively remote from base plate 14. These portions 17 and 18 are, for example, conical in shape and are engageable in correspondingly shaped apertures 17a and 18a formed in lateral housing members 19 and 20 respectively.

As shown in FIG. 2, the wedge portion 17 is retracted from the aperture 17a, whereas the wedge portion 18 located in its aperture 18a and is therefore locked in position.

The head 2 can be opened by moving the upper portion 4 thereof away from the lower portion 4a. To achieve this, the wedge portions 17 and 18 are initially moved out of their apertures 17a and 18a in lateral housing members 19 and 20. The hydraulic cylinder 6 is then operated and the upper portion 4 of the head 2 is pivoted about its pivot point 5.

By so doing, it is made possible, without any additional measures, for the head to be cleaned, for flow inserts (if any) and/or profiled bars, to be interchanged and for the screw 21 of the extruder 1 to be extracted and, if desired, exchanged.

After any or all of these operations have been completed, the upper portion 4 of the head 2 is again lowered by means of the double-acting hydraulic piston and cylinder arrangement 6. It is locked in position by causing the wedge portions 17 and 18 to be moved outwardly into their housing apertures 17a and 18a. When so located, the head 2 is very securely locked in position.

Surprisingly, it has been found that the provision of a spacing between the portions 4 and 4a of the head 2 facing the roller 3 and the surface of the roller 3 itself which lies in the range of from 50μ to 500μ permits the final width of the profile or of a material web to be kept within narrow tolerance widths. This is, of course, dependent upon other parameters such as the extrusion pressure and the circumferential speed of the roller 3 having previously been set.

Once these parameters have been set and, if desired, detected by monitoring devices and when appropriate regulating steps are taken, the single-roller head can be operated automatically.

Material pressures of up to 250 bars are produced in the flow conduit 23 in the interior of the head. The pressure is detected by means of a pressure-measuring device 22 and is monitored and, if necessary, controlled by a control device 24.

In dependence upon the measured pressure value, the control device 24 acts upon a drive means (not shown in the drawing) for the roller 3 in such a manner that, from a pre-set pressure, the drive means for the roller 3 can increase by up to 2%, the circumferential speed of the roller 3. This means that more material can be discharged from the interior 23 of the head 2, thereby reducing the width of the profile or strip until a fixed or desired width is attained.

Producing a profile 27 of a precise width, accurate to within one millimeter, is achieved by providing an edge trimming device. Such device comprises a cutting blade 26 and a driven cutting roller 25. The blades may be disposed in such a manner that it is also possible to make cuts therewith which extend at an inclined angle relative to the direction of working of the material.

Alternatively, independence upon the measured pressure value in the interior 23 of the head 2, the control device 24 may also act upon a drive means (not shown) for the screw 21 of the extruder 1. By so doing, the rotational speed of the screw may be reduced slightly by up to 2%, if a predetermined pressure value is exceeded. The throughput of the extruder is thus reduced accordingly. In consequence, the pressure in the interior 23 of the head 2 drops and the width of the profile emerging from the head becomes slightly narrower, assuming that the roller is driven at a constant circumferential speed. The quantity of trimmed edges is, accordingly, also reduced.

Due to the monitoring of the pressure by means of the device 22 and because the circumferential speed of the roller or the rotational speed of the screw are adjusted in dependence upon the pressure, certain improvements compared with known arrangements appear to be present.

Firstly, the head portions 4 and 4a may be spaced only a short distance from the roller 3 without the need for both portions to have initial tensioning relative to one another. Secondly, the problems arising from the use of pressure or wearing plates, such as wear on the intermediate plate and on the rotating roller are totally eliminated. This, as mentioned hereinbefore, is a major problem in the arrangement disclosed in European Patent Specification No. 00 05 077.

Finally, no material accumulates between the pressure plate and the surface of the roller, since no material is subject to abnormal thermal loading and there is no material present to give rise to impurities.

In consequence, there is no need, in the present arrangement, for lateral boundary plates.

Alternatively, the width of the emergent web 27 may also be scanned on each side by means of photoelectric diodes 8. If the width of the web or profile increases to beyond predetermined limits, the control device 24, which is connected to the photoelectric diodes 8, adjusts the circumferential speed of the roller 3 and/or the rotational speed of the screw 21.

Finally, the roller 3 is rotatably mounted in bearings 31. these bearings are themselves mounted on the side wall members 19 and 20.

I claim:

1. Apparatus for producing profiles or webs such as tread strips for vehicle tires, comprising:
   (a) an extruder including a barrel having an internal surface defining a chamber having a longitudinal horizontally extending axis, screw means rotatable in said chamber and drive means for said screw means, and drive means operatively connected to said roller, said barrel defining a discharge end for discharging extruded material from said chamber;
   (b) extruder head means communicating with the discharge end of said chamber for receiving extruded material, said extruder head means comprising:
      (1) first and second opposed lateral side walls, said side walls being formed with wedge-shaped openings;
      (2) a first head portion, and means for pivotally mounting the same on said opposed side walls for movement between a first, closed position and a second open and elevated position;

(3) means for locking said first head portion in a closed position comprising fluidically actuated wedge-shaped locking members engageable in said openings in said opposed side walls, and piston-cylinder means mounted on said opposed side walls and operatively connected to said locking members for actuating the same;

(4) a second head portion located below said first head portion and defining therewith a channel for the passage of extruded material therethrough; and (5) profiled bar means mounted on said first head portion and projecting into said channel for shaping the extruded material; and (c) roller means mounted between said opposed side walls, and means for mounting and rotating said roller means on a horizontal axis of rotation, said roller means including an external surface over which the extruded material passes, said external surface being disposed totally below, and downstream and spaced from the internal surface of said barrel, and drive means operatively connected to said roller, said external surface of said roller also being spaced from said first and second head portions;

whereby said first head portion can be rotated upwardly upon release of said locking member so as to expose said barrel and screw means for cleaning, or replacement.

2. An apparatus as recited in claim 1, further comprising control means for regulating the width of said profile or web discharged from said channel, said control means comprising pressure measurement means for measuring the pressure in said channel, said pressure measurement means being operatively connected to at least one of said drive means for said roller and said drive means for said extruder screw such that the rate of rotation of at least one of said roller and said screw is modified in dependence upon said pressure measured by said measurement means.

3. An apparatus as recited in claim 1, further comprising control means for regulating the width of said profile or web discharged from said channel, said control means comprising a plurality of photoelectric diodes directed towards the edges of said profile or web for determining the locations of said edges, said control means being operatively connected to at least one of said drive means for said extruder screw means and said drive means for said roller such that the rate of rotating of at least one of said roller and said screw means is modified in dependence upon said location of said edges as determined by said photoelectric diodes.

* * * * *